(12) United States Patent
Meir

(10) Patent No.: US 6,980,913 B2
(45) Date of Patent: Dec. 27, 2005

(54) METHODS OF DETERMINING CHANNEL INFORMATION BASED ON ENERGY MEASURED AT MULTIPLE FREQUENCIES

(75) Inventor: Alon D. Meir, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 92 days.

(21) Appl. No.: 10/748,481

(22) Filed: Dec. 30, 2003

(65) Prior Publication Data

US 2005/0140354 A1   Jun. 30, 2005

(51) Int. Cl.[7] .................................................. H04J 1/00
(52) U.S. Cl. .................... 702/77; 702/76; 702/75; 370/480
(58) Field of Search ............................. 702/77, 60, 69, 702/75, 76, 66, 71, 73, 74, 122, 189, 193; 324/76.19, 76.21, 76.22; 370/480, 487, 490, 370/484, 431, 302, 281, 343, 335, 342

(56) References Cited

U.S. PATENT DOCUMENTS

| | | | | |
|---|---|---|---|---|
| 5,257,211 A | * | 10/1993 | Noga | 702/60 |
| 5,477,465 A | * | 12/1995 | Zheng | 702/76 |
| 5,809,427 A | * | 9/1998 | Perreault et al. | 455/513 |
| 5,939,887 A | * | 8/1999 | Schmidt et al. | 324/628 |
| 6,804,262 B1 | * | 10/2004 | Vogel et al. | 370/480 |
| 2004/0203392 A1 | * | 10/2004 | Hsu et al. | 455/62 |

* cited by examiner

*Primary Examiner*—Hal Wachsman
(74) *Attorney, Agent, or Firm*—Buckley, Maschoff & Talwalkar LLC

(57) ABSTRACT

A method, apparatus, and system for spectrum analysis. The method, apparatus, and system for spectrum analysis include measuring energy incident at a frequency in a frequency spectrum corresponding to a channel, but not all frequencies in the frequency spectrum, and determining whether the energy measured at the frequency exceeds a valid channel threshold.

15 Claims, 5 Drawing Sheets

Method of Analyzing a Spectrum

METHODS OF DETERMINING CHANNEL INFORMATION BASED ON ENERGY MEASURED AT MULTIPLE FREQUENCIES

BACKGROUND

Television media and other forms of communication media provide signals that include discrete frequency spectrums at which programming channels may exist. It is sometimes necessary to search a communication signal to identify whether valid channels are included at one or more of those frequencies and further to determine the type of channel present when a valid channel is identified.

BRIEF DESCRIPTION OF THE DRAWINGS

The accompanying drawings, wherein like reference numerals are employed to designate like components, are included to provide a further understanding of spectrum analysis, are incorporated in and constitute a part of this specification, and illustrate embodiments of spectrum analysis that together with the description serve to explain the principles of spectrum analysis.

In the drawings.

DETAILED DESCRIPTION

Systems, apparatuses, and methods for analyzing a spectrum, including cable modems carrying one or more analog and/or digital programming channels in frequency spectrums are provided herein. Those programming channels may include television programming, audio, video, graphics, text or other information at various frequencies spectrums. That information may include any data capable of being represented as a signal, such as an electrical signal, an optical signal, an acoustical signal, or another form of signal.

Any reference in the specification to "one embodiment," "a certain embodiment," or a similar reference to an embodiment is intended to indicate that a particular feature, structure or characteristic described in connection with the embodiment is included in at least one embodiment of a spectrum analysis system, apparatus, or method. The appearances of such terms in various places in the specification are not necessarily all referring to the same embodiment. References to "or" are furthermore intended as inclusive so "or" may indicate one or another of the ored terms or more than one ored term.

Figure 1:
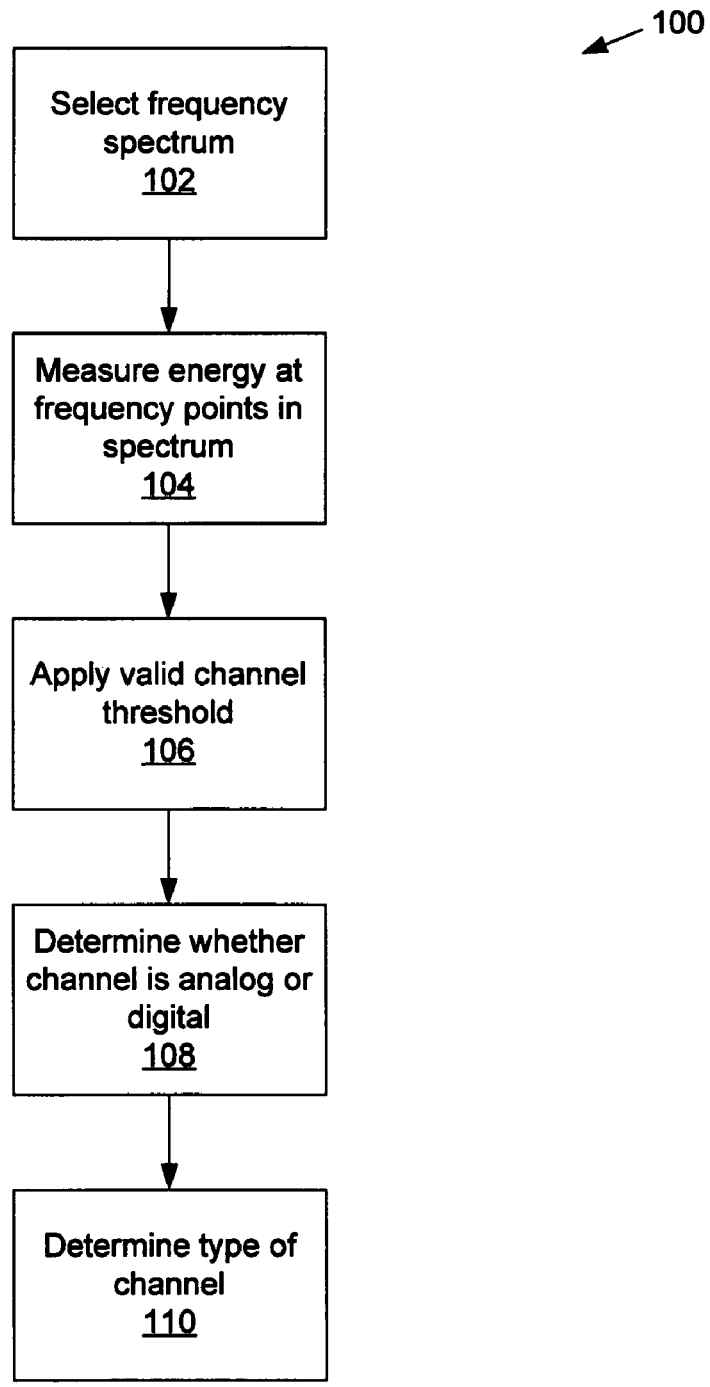
FIG. 1 illustrates an embodiment of a method of analyzing a spectrum.

FIG. 1 illustrates an embodiment of a method of analyzing a spectrum 100. That method may validate a communication channel and determining a type of signal present on a valid channel. The method of analyzing a spectrum 100 may find a valid communication channel and may also determine the type of information carried by the valid communication channel. At 102, a frequency spectrum that may include a channel is selected. That frequency spectrum may be selected from a range of frequencies incident on a signal that includes many frequency spectrums, each frequency spectrum corresponding to a channel. In certain communications media, protocols such as Data Over Cable Service Interface Specifications (Docsis) or Annex B specify a pre-designated frequency plan that indicates frequency spectrums that may be assigned to valid channels. A pre-designated frequency spectrum that may contain a channel may therefore be selected for consideration from the pre-designated frequency plan of such a communication medium.

In other communications media, protocols such as Annex A that have no pre-designated frequency plan may be used. Where no pre-designated frequency plan exists, one or more frequency spectrums may be considered in any desired way. For example, when it is desired to validate channels throughout a range of frequencies that may potentially contain a plurality of valid channels, a first frequency spectrum containing a channel may be identified and then additional frequency spectrums of a size that correspond to a channel may be considered in uniform steps from that first frequency spectrum containing a channel throughout the frequency range.

At 104, energy incident at one or more frequency points within the frequency spectrum may be measured. It has been found through experimentation that measuring the energy incident at three frequency points near the center of the spectrum and one frequency point near each edge of the spectrum may provide adequate data with which to determine whether a valid channel exists in that frequency spectrum and what type of signal is carried on that channel. Other numbers of frequency points and distributions of frequency points may, however, be desirable depending on the type of signal being analyzed and the equipment utilized to perform the analysis. Moreover, additional frequencies may be sampled after analysis of the initial samples where validity or type of signal was not able to be determined with certainty utilizing only the original sampling.

At 106, the energy measured in one or more of the frequency points may be compared to one or more valid channel thresholds. For example, where it is expected that the highest energy in the spectrum will be incident near the center of the frequency spectrum, the energy measured at the frequency points near the center of the frequency spectrum may be compared to the valid channel threshold. If the measured energy at any of the frequency points exceeds the valid channel threshold, then it may be determined that a valid channel exists in that frequency spectrum.

At 108, measured energy at two or more frequencies in the frequency spectrum of a channel may be compared to each other to determine whether a valid channel is carrying an analog signal or a digital signal. Such a process may be referred to as coarsely estimating a shape of the signal by measurement of a few, and typically much fewer than all frequencies in the frequency spectrum. Digital information generally has a flat profile with signal peaks being similar and not disparate in amplitude throughout much of the frequency spectrum, while analog information generally has signal peaks that vary or are disparate throughout the frequency spectrum. Thus, where measured energy levels of frequencies near the center of the frequency spectrum are similar, the signal may be assumed to be digital and where measured energy levels of frequencies near the center of the frequency spectrum are varied, the signal may be assumed to be analog.

The quality of the signal may also be estimated using measurements of a few of many frequencies in a frequency spectrum. For example, energy measured in a frequency spectrum carrying a valid channel, particularly higher measured frequencies in that frequency spectrum, may be compared to the energy measured at a frequency where no valid channel exists. If the difference between the energy at those valid and invalid frequencies is minimal, then the quality of the channel may be low, while the quality of the channel may be high if that difference is great.

At 110, the type of channel carried on a frequency spectrum having a valid channel may be determined. For example, in a channel carrying one of the several types of Quadrature Amplitude Modulation (QAM) type signals, energy measurements from various portions of the frequency spectrum may be compared to determine the QAM type used for a channel.

Embodiments of spectrum analysis may be applied to various nodes communicating by way of various communications mediums such as, for example, modems, voiceband, or broadband communication mediums. Communications may furthermore be either unidirectional wherein communications are directed from one or more nodes to one or more other nodes, or bidirectional where communications occur both to and from nodes. Examples provided herein describe embodiments wherein televisions or computers receive communications by way of cable modem as an example, but are intended to be exemplary and not limiting.

In communications, the term "baud" is used to represent unique line conditions. Each unique line condition is referred to as a symbol. In certain systems, one bit is sent in conjunction with each symbol, while in other systems multiple bits are sent in conjunction with each symbol. For example, QAM may utilize both phase shifts and amplitude to permit the transmission of a number of bits per symbol. A plurality of samples may then be transmitted and received to create or read a signal that represents each symbol. Embodiments of the present invention may be applied to either single or multiple bit transmissions per symbol. Bit transmission is typically expressed in bits per second or bps.

Analog mediums generally carry digital information using one or more of three analog modulation techniques. Those three analog modulation techniques are amplitude modulation, frequency modulation, and phase modulation. Amplitude is the signal strength, or signal power, and is the relative "height" of the wave. Frequency is the rate at which an electromagnetic waveform alternates as is usually measured in Hertz (cycles per second) and equals the number of complete cycles occurring in one second. Phase is the relationship between a signal and its horizontal axis, also called the zero access point.

Variations of channel type such as, for example, QAM may combine amplitude modulated information into a single frequency or frequency spectrum and may also combine amplitude modulated information with pulse amplitude modulated information forming a signal that may simultaneously carry multiple pieces of information.

QAM types may vary in numerous aspects including the bandwidth used by a channel utilizing that QAM type. Therefore, energy may be measured, for example, at a point corresponding to or nearly corresponding to an edge of the frequency spectrum until one edge of the actual bandwidth utilized by the channel is found. The edge may be found by comparing energy measurements to an edge threshold, with the edge being at a frequency where the measured energy exceeds the edge threshold and where a neighboring frequency has a measured energy less than the edge threshold. Where a frequency corresponding or nearly corresponding to the center of the bandwidth utilized by the channel has already been found, the total bandwidth utilized by the channel may be equal to twice the frequency range from the one edge to the center of the actually utilized bandwidth. Alternately, measurements of energies present at or near frequencies at each end of the frequency spectrum may be taken until each end of the utilized bandwidth is discovered and the bandwidth may be determined to be the difference between those two ends. The channel type may then be discerned by comparison of the actual bandwidth utilized by the channel with the bandwidths known to be utilized by the various channel types, with the channel being of the QAM type or other type that has a bandwidth closest to the measured bandwidth.

To step through a frequency range potentially containing numerous channels when analyzing a signal utilizing a protocol that has no pre-designated frequency plan, a determination may be made as to an approximate minimum bandwidth in which a channel may exist. The energy existing at two or more frequency points within a first such minimum bandwidth may then be measured. The energies measured may then be compared to a threshold that, when exceeded, indicates a channel exists in that frequency spectrum. If a channel is found to exist, the energies may be compared one to another to find the frequency point having the highest energy of the frequency points measured. Additional frequencies around the highest measured energy frequency point may then be measured if desired to find other frequency points having higher energy measurements. The frequency having the highest measured energy in the minimum bandwidth may then be selected as corresponding to the center of the frequency spectrum or another significant point within the frequency spectrum.

Once the center or other significant point corresponding to a valid channel is found, the entire signal bandwidth or a portion thereof may be further explored at steps that are multiples of the minimum bandwidth from the center of the found channel. Additional valid channels may be centered at such steps. Thus, for example if the bandwidth occupied by a channel is approximately 6 MHz, the center of an adjacent channel may be located at the highest energy frequency discovered plus or minus 8 MHz. Additional channels may further be discovered at various negative and positive multiples of the bandwidth occupied by a channel from the highest frequency discovered in the first bandwidth searched. Thus, valid channels may be searched at each of those channel bandwidth steps from a discovered valid bandwidth.

The method of analyzing a spectrum 100 may be repeated for each frequency spectrum present in the signal or for each frequency spectrum of interest until all desired channels are determined to be valid or invalid and the type of signal present at each valid channel is known.

Other methods of analyzing a frequency in which a channel may lie may scan the entire frequency spectrum to measure the energy therein to identify a valid channel. Those methods may further repeat such scanning for each possible mode in which a channel may be transmitted until a valid channel is discovered or until it is determined that no valid channel exists in that frequency spectrum. Those methods may thus result in rejection of an invalid channel utilizing a particular processor and peripheral equipment in approximately two seconds, while the spectrum analyzer and method of analyzing a spectrum provided herein may be capable of rejecting an invalid channel in approximately three milliseconds utilizing the same processor and peripheral equipment. The time required to find a valid channel is also generally reduced using the spectrum analyzer and method of analyzing a spectrum provided herein. Moreover, the present spectrum analyzer and method of analyzing a spectrum may provide such response time while utilizing a DFT, which is generally less expensive than a FFT that is used in most of the other methods.

Figure 2:
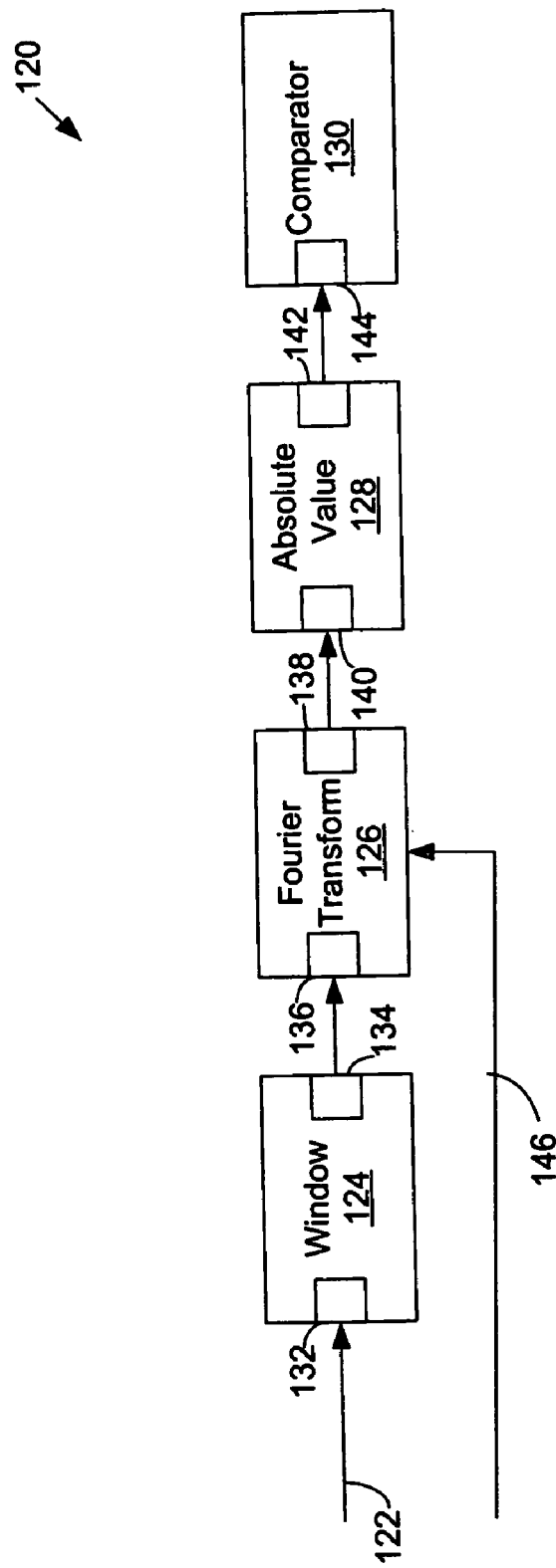
FIG. 2 illustrates an embodiment of a spectrum analyzer.

FIG. 2 illustrates an embodiment of a spectrum analyzer 120. The spectrum analyzer 120 measures the energy at a frequency in a frequency spectrum incident on an input signal 122 and may compare that energy in various ways to provide data related to the information carried on the input signal 122. The input signal 122 may have a range of frequencies and carry desired information at one or more channels at frequency spectrums within the frequency range. The spectrum analyzer 120 includes a windowing module 124 that receives the input signal 122 in samples. The windowing module 124 transmits groups of samples received to a Fourier transform module 126 where the energy of the input signal 122 may be determined at one or more frequencies. The result produced by the Fourier transform module 126 may be a complex number and the absolute value of that complex number may be found at an absolute value module 128. The absolute value module 128 may thus provide a total energy signal corresponding to the total energy present in the input signal 122 at the desired frequency. Such an energy measurement may be utilized in the method of analyzing a spectrum 100 to determine whether desired information exists at or around the frequency analyzed in the input signal 122. Comparisons made between energy measured at two or more frequencies or between energy measured at a particular frequency and a threshold may be performed at a comparator 130.

Using the spectrum analyzer 120, frequencies may be quickly considered one at a time, with the result indicating whether a channel exists at or around the considered frequency or in a frequency spectrum in which the few considered frequencies are incident. A determination of the type of channel present may also be made using the spectrum analyzer 120. The determination of whether a valid channel exists may be confirmed by a comparison to a valid channel threshold as described at 106 in connection with FIG. 1 and a determination of the type of channel carried on a frequency spectrum having a valid channel may be determined as described at 108 and 110 in connection with FIG. 1.

The input signal 122 may be generated by a transmitting node and received by a receiving node in samples. Those samples are typically discrete portions of the signal that, in combination, form, for example, one or more amplitudes occurring at one or more frequencies or one or more phase shifts representing one or more data streams of information. That information may include, for example, a television transmission, video and/or audio data, graphic data, or character strings. The samples are typically generated at the transmitting node by a sample generating device and translated into digital information by a translating device when received at the receiving node. Thus, signals may be communicated by way of samples transmitted from the transmitting node and received at the receiving node.

Those samples may then be grouped in windows at the windowing module 124 so that one or more frequencies or small frequency ranges carried on the signal that may not be identifiable in individual samples may be identified as a plurality or group of samples in a window.

As is known to those skilled in the area of frequency sampling, and as stated by the Nyquist Theorem, an important consideration for sampling is that the sampling rate or the rate at which samples are taken from the input signal 122 and provided to the windowing module 124 must be at least twice the highest analog frequency component of a portion of a signal being sampled that is desired to be measured. The Nyquist Theorem thus suggests that for a digital representation of an analog signal, such as a signal carrying audio and video, to accurately represent the analog signal, the rate at which samples should be provided to the windowing module 124 must be at least twice the highest analog frequency component of interest in the input signal 122.

The number of samples to be taken into consideration in a window may be set to a minimum of twice the highest analog frequency component of interest in the signal and may include many more samples to provide a more complete representation of the signal. A number of samples to be taken may, for example, be calculated by dividing a chosen sampling rate, which may be measured in samples per second, by the lowest frequency of interest, generally measured in Hertz (Hz). Thus, for example, if the sampling rate chosen is 2400 samples per second and the lowest frequency of interest is 100 Hz, then the number of samples that could be taken at one time for Fourier analysis might be 2400/100, or 24 samples.

Additional samples may be included to improve accuracy of the power spectrum measured. Windows having a larger number of samples generally provide more robust detection of information carried on the signal than smaller sample sizes, but also require more processing power than windows having smaller sample sizes. A maximum number of samples may, accordingly, be limited by an amount of memory or processor time available for processing those samples. A number of samples may, therefore, be selected practically to provide enough accuracy to identify a standard from amongst multiple standards on which the signal is being carried.

A polynomial type window may be created by the windowing module 124 to reduce the effect of noise present in the signal. That polynomial window may be created using a variety of known techniques including the use of a Bartlett, Blackman, Hamming, Hann, or Kaiser windowing techniques.

The windowing module 124 may be performed by software executed in a processor or may be performed by hardware designed to perform windowing functionality. For example, windowing may be performed by an Application Specific Integrated Circuit (ASIC). Moreover, the windowing module 124 may include a window input 132 to receive samples of a communication signal and a windowing output 134, incident on which the windowing module 124 may place a window signal representative of the plurality of samples windowed.

A Fourier transform may then be performed at the Fourier transform module 126 and used to process the groups of samples included in each of one or more windows as is known in the signal processing technologies. For example, the Fourier transform then may convert the sampled signal to a function of frequency. That frequency may, in turn, reveal the energy being carried on the signal.

The Fourier transform module 126 may utilize a Discrete Fourier Transform, or DFT, or a Fast Fourier Transform, or FFT. The Fourier transform module 126 may, furthermore, be implemented in software or hardware and may be performed by a variety of devices including, for example a general purpose processor appropriately programmed to perform a Fourier transform through software, a digital signal processor, or an ASIC. A DFT generally requires less processing power to measure the energy of a particular frequency or a few frequencies than an FFT, whereas an FFT generally requires less processing power than a DFT when measuring the energy of a wide range of frequencies. Thus, a DFT may be used in the present spectrum analyzer 120 because the spectrum analyzer 120 measures one or more frequencies within a frequency spectrum of the input signal 122 to find one or more valid channels and identify invalid channels and generally does not consider the entire range of frequencies included in the input signal 122. Thus, for example, it has been found that when measuring the energy of the input signal 122 in fewer than thirty frequencies, use of a DFT in the spectrum analyzer 120 results in use of less processing power than use of an FFT.

The Fourier transform module 126 may include a Fourier transform input 136 that may be coupled to the window output 134 and a Fourier transform output 138, incident on which the Fourier transform module 126 may place a signal representing positive and negative energy present in the samples of the received window.

The absolute value module 128 may also be performed by any desired device including a general purpose processor or an ASIC. The absolute value module 128 may include an absolute value input 140 to couple to the Fourier transform output 138 and an absolute value output 142. The absolute value module 128 may take the absolute value of a value carried on the Fourier transform signal representing positive and negative energy present in the samples of the received window, resulting in a value representing total energy present in the samples of the received window and provide a signal representing that total energy at the absolute value output 142.

The comparator 130 may be coupled to the absolute value output 142 at a comparator input 144 and thereby receive a signal representing the total energy at a frequency. The comparator 130 may perform various comparisons utilizing that total energy such as those described in connection with the method of analyzing a spectrum 100 and including a comparison between the total energy measured at a frequency and a threshold such as the valid channel threshold and comparisons between the total energy measured at two or more frequencies that may be utilized, for example, in determining the type of signal present in a frequency spectrum.

Thus the spectrum analyzer 120 may be utilized in the method of analyzing a spectrum 100 to measure the total energy at one or more frequencies incident on an input signal 122. For example, the spectrum analyzer 120 may be used by a demodulator in a receiving node receiving information from a cable modem. The spectrum analyzer 120 may be used to identify a channel that is valid because it is carrying information, from among a range of frequencies that may or may not also carry information. That spectrum analyzer 120 may alternately be used in another device to identify a frequency carrying information from another medium if desired. Use of the spectrum analyzer 120 with a demodulator receiving information from a cable modem is provided herein as an exemplary use of the spectrum analyzer 120. The spectrum analyzer 120 may also be used to find the modulation type of the frequency channel once that channel has been found.

Figure 3:
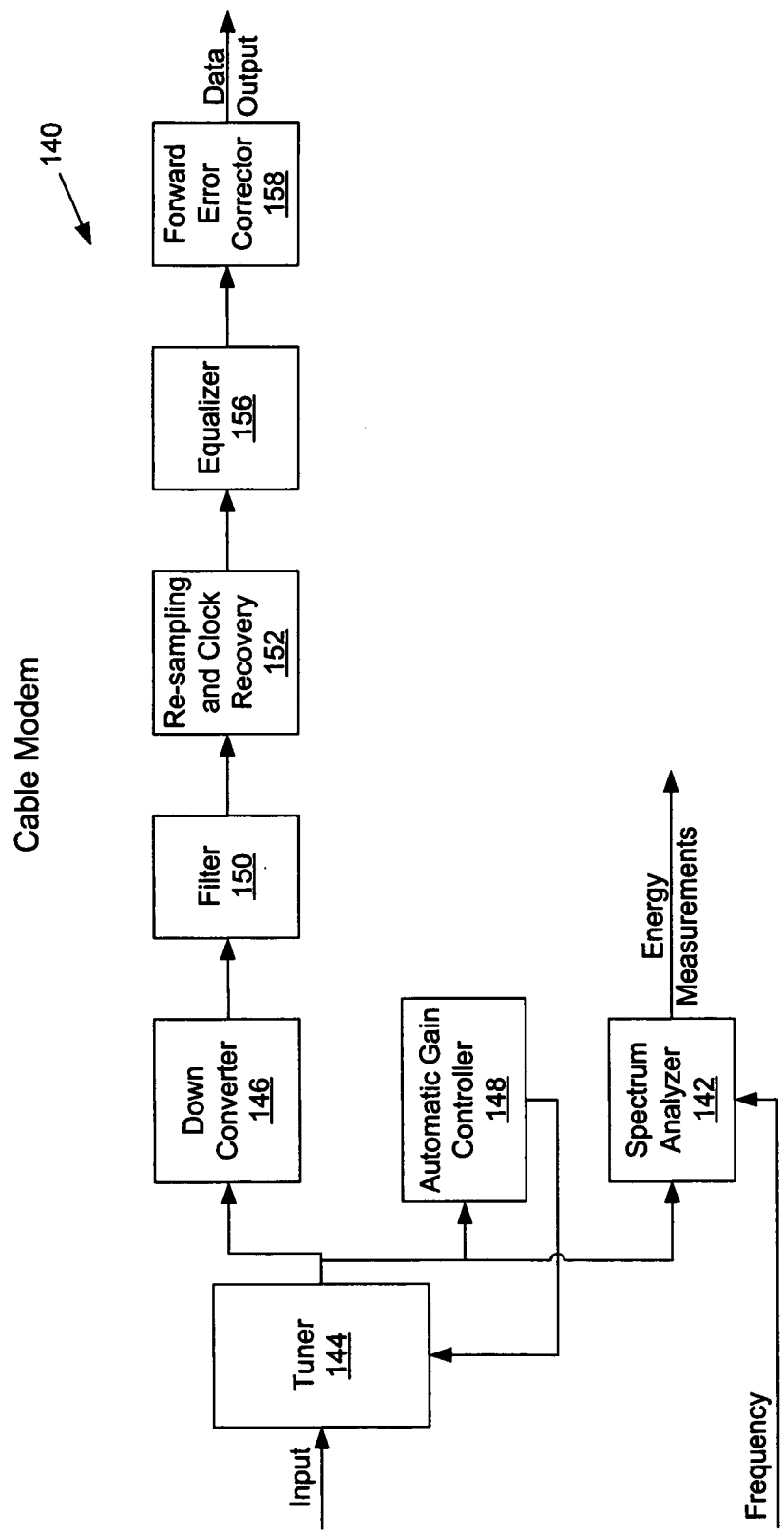
FIG. 3 illustrates an embodiment of a demodulator suitable for performing spectrum analysis.

FIG. 3 illustrates an embodiment of a demodulator 140 that includes a spectrum analyzer 142 such as, for example, the spectrum analyzer 120 of FIG. 2. The demodulator 140 receives an RF (radio frequency) signal at a tuner 144. The tuner 144 may convert the RF signal to an IF (intermediate frequency) signal and may furthermore sample, filter, and amplify that IF signal in certain applications and output samples of the received signal. Those samples are then transmitted to the spectrum analyzer 142, a down converter 146, and an automatic gain controller 148. The spectrum analyzer 142 may operate as described in connection with the spectrum analyzer 120 illustrated in FIG. 2 and may also receive a frequency signal and provide a power measurement at one or more frequencies as described in connection with FIG. 2. The spectrum analyzer 142 may further operate on the measured energy by comparing that energy to one or more thresholds or additional measured energy at additional frequencies.

The automatic gain controller 148 may operate to adjust the level of the received signal to a desired level and provide the adjusted signal to the tuner 144. The down converter 146 may perform frequency translation on the sampled signal and output a signal having a frequency that is lower than the received sample signal. The filter 150 may then remove undesired portions of the signal received from the down converter 146 and the re-sampling and clock recovery module 152 may adjust the filtered signal to compensate for frequency or phase differences between a transmitter transmitting the input signal and a receiver receiving the input signal. The equalizer 154 may then equalize the re-sampled signal and the forward error corrector 156 may correct errors existing in data received from the equalizer 156 and provide a data output to be read by a device such as the viewing device 200 of FIG. 4.

Figure 4:
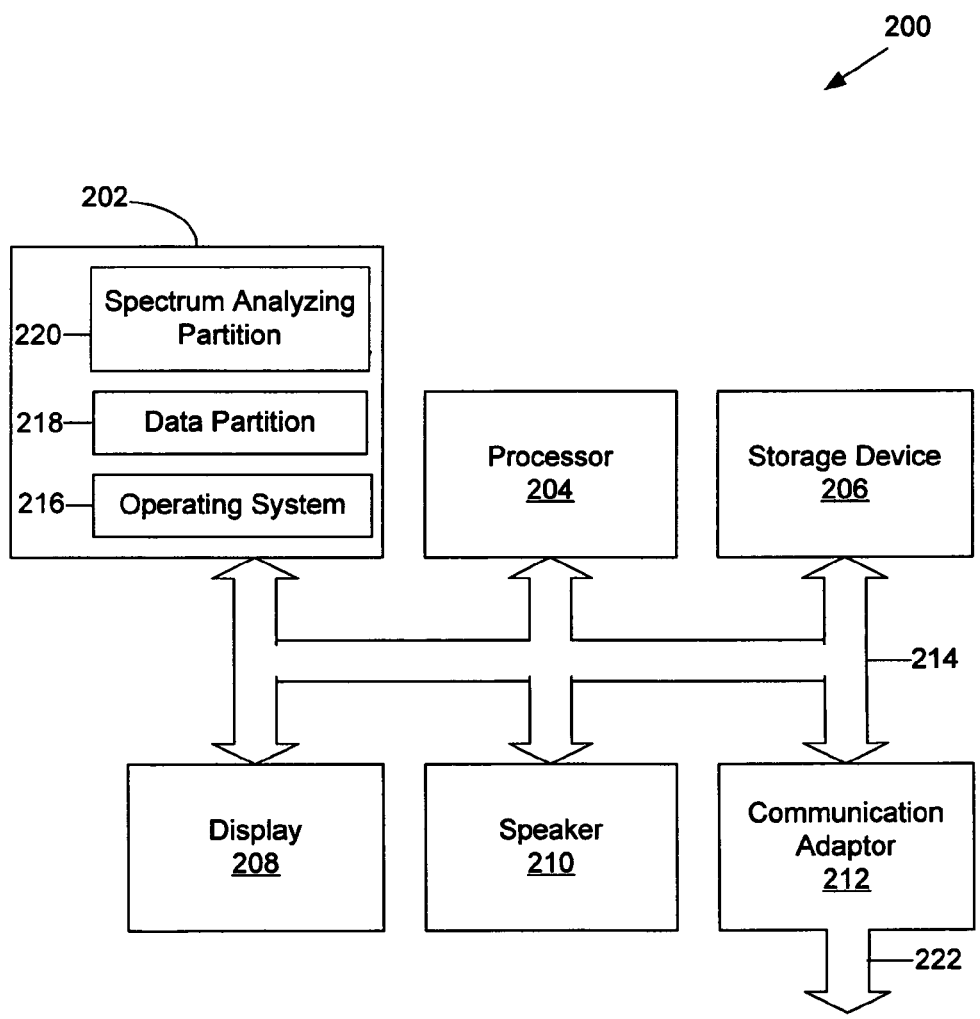
FIG. 4 illustrates an embodiment of a viewing device suitable for analyzing a spectrum.

It should be recognized that the down converter 146, filter 150, re-sampling and clock recovery module 152, equalizer 154, and forward error corrector 156 may be used to provide a signal to a viewing device such as the viewing device 200 of FIG. 4 but may not be necessary for operation of the spectrum analyzer 142. Moreover, the automatic gain controller 148 may also not be necessary for operation of the spectrum analyzer 142.

FIG. 4 illustrates an embodiment of a viewing device 200 having a channel validation capability. The viewing device 200 includes memory 202, a processor 204, a storage device 206, a display 208, a speaker 210, and a communication adaptor 212. It should be recognized that any or all of the components 202–212 of the viewing device 200 may be implemented in a single machine. For example, the memory 202 and processor 204 might be combined in a state machine or other hardware based logic machine.

It should also be recognized that the viewing device 200 may have fewer components or more components than shown in FIG. 4. For example, the storage device 206 may not be necessary for operation of the viewing device 200 and may not be included therein if not desired.

The memory 202 may, for example, include random access memory (RAM), dynamic RAM, and/or read only memory (ROM) (e.g., programmable ROM, erasable programmable ROM, or electronically erasable programmable ROM) and may store computer program instructions and information. The memory 202 may furthermore be partitioned into sections including an operating system partition 216, wherein instructions may be stored, a data partition 218 in which data may be stored, and a spectrum analysis partition 220 in which instructions for identifying and/or typing a valid channel may be stored. The spectrum analysis partition 220 may also allow execution by the processor 204 of the instructions stored in the spectrum analysis partition 220. The data partition 218 may furthermore store data to be used during the execution of the program instructions such as, for example, the valid channel threshold and information about types of channels.

The processor 204 may execute the program instructions and process the data stored in the memory 202. In one embodiment, the instructions are stored in memory 202 in a compressed and/or encrypted format. As used herein the phrase, "executed by a processor" is intended to encompass instructions stored in a compressed and/or encrypted format, as well as instructions that may be compiled or installed by an installer before being executed by the processor 204.

The storage device 206 may, for example, be a magnetic disk (e.g., floppy disk and hard drive), optical disk (e.g., CD-ROM) or any other device or signal that can store digital information. The communication adaptor 212 may include a demodulator and may permit communication of information from a communication medium, such as a cable modem to the viewing device 200 at a communication adaptor port 222. It will be recognized that the viewing device 200 may alternately or in addition be coupled directly to one or more other devices through one or more input/output adaptors (not shown).

The viewing device 200 may be incorporated into a general purpose or specific purpose computer and may also be coupled to one or more input devices (not shown) such as, for example, a keyboard or mouse. It will be recognized, however, that the viewing device 200 does not necessarily need a keyboard or mouse to operate.

The elements 202, 204, 206, 208, 210, and 212 of the viewing device 200 may communicate by way of one or more communication busses 214. Those busses 214 may include, for example, a system bus, a peripheral component interface bus, and an industry standard architecture bus.

The network in which spectrum analysis is implemented may be a network of nodes such as televisions, computers, or other, typically processor-based, devices interconnected by one or more forms of communication media. The communication media coupling those devices may include, for example, twisted pair, co-axial cable, optical fibers and wireless communication methods such as use of radio frequencies. Network nodes may furthermore be equipped with the appropriate hardware, software or firmware necessary to communicate information in accordance with one or more standards or protocols.

Figure 5:
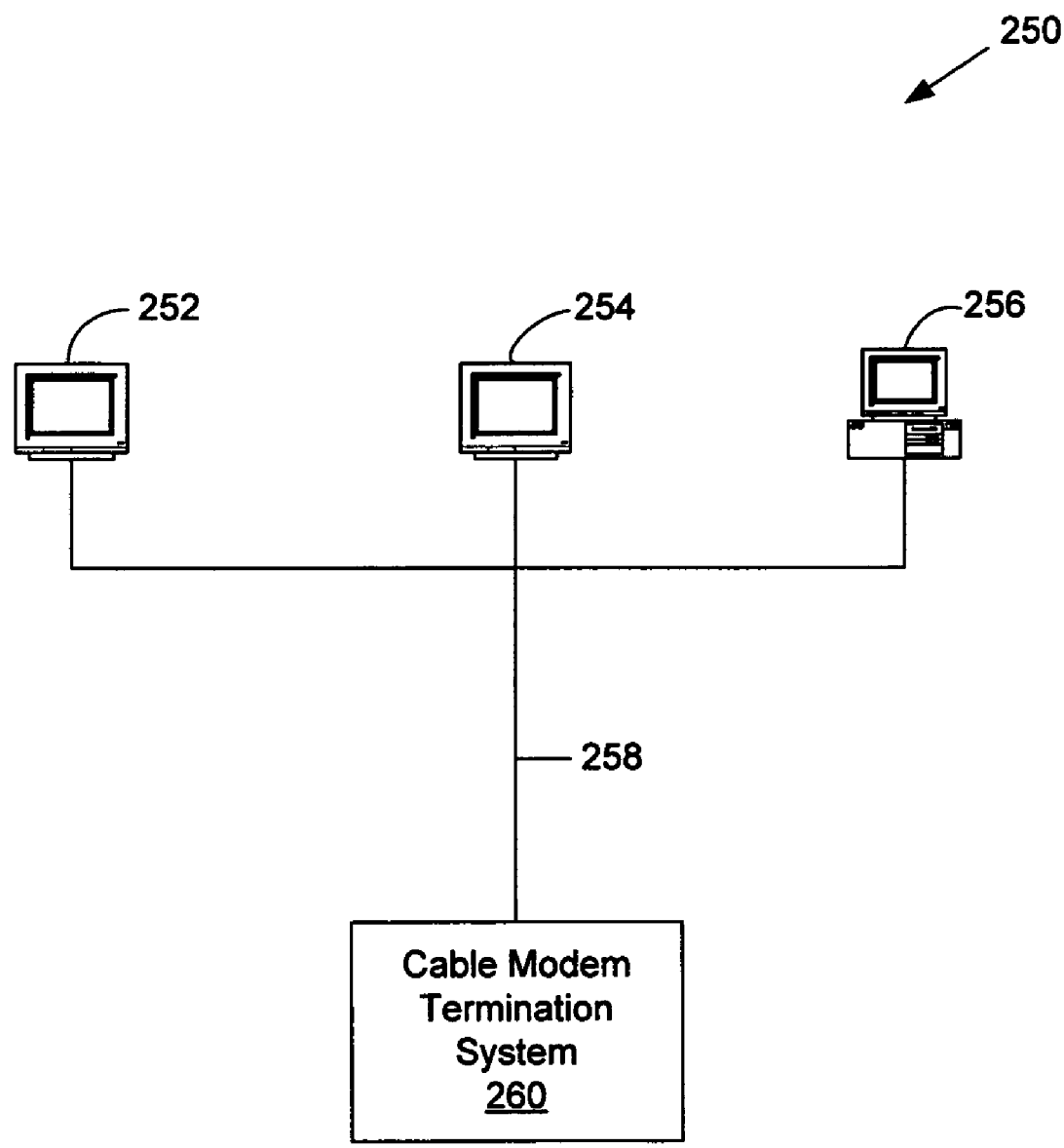
FIG. 5 is a block diagram of an embodiment of a cable modem network in which a spectrum may be analyzed.

FIG. 5 illustrates an embodiment of a cable modem network 250 in which two televisions 252 and 254, and a computer based viewing device 256 are coupled to a cable 258 to receive signals transmitted across the cable 258 from a transmitter 260. The transmitter 260 may include a Cable Modem Termination System, for example that transmits cable modem signals to a plurality of viewing devices such as the televisions 252 and 254 and computer based viewing device 256. The network may alternately or in addition include a Local Area Network (LAN), a Wide Area Network (WAN), the Internet, a Public Switched telephone Network (PSTN), or a radio frequency network having signals transmitted, for example, from a satellite.

While the systems, apparatuses, and methods of spectrum analysis have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A method, comprising:
   measuring energy incident at a first frequency in a frequency spectrum associated with a channel;
   measuring energy incident at a second frequency in the frequency spectrum, wherein energy associated with at least some frequencies in the spectrum are not measured;
   determining whether the energy measured for at least one of the first or second frequencies exceeds a valid channel threshold;
   determining a bandwidth utilized by the channel based on the first and second frequencies; and
   identifying a channel type based on the determined bandwidth.

2. The method of claim 1, wherein the first frequency is associated with a center of the frequency spectrum, the second frequency is associated with an edge of the frequency spectrum, and the determined bandwidth is associated with double the range between the center and edge frequencies.

3. The method of claim 1, wherein the first frequency is associated with a first edge of the frequency spectrum, the second frequency is associated with a second edge of the frequency spectrum, and the determined bandwidth is associated with the range between the first and second edge frequencies.

4. The method of claim 1, further comprising:
   comparing the energy measured at the first frequency to the energy measured at the second frequency;
   identifying the channel as carrying analog data if the energies measured at the first frequency and the second frequency are disparate; and
   identifying the channel as carrying digital data if the energies measured at the first frequency and the second frequency are not disparate.

5. The method of claim 1, wherein the channel is valid if the energy measured for at least one of the first and second frequencies exceeds the valid channel threshold.

6. The method of claim 1, wherein the channel is not valid if the energy measured for at least one of the first and second frequencies does not exceed the valid channel threshold.

7. The method of claim 1, further comprising selecting the frequency having the highest measured energy and assuming that a channel is centered near that frequency if at least one of the measured energies exceeds the valid channel threshold.

8. The method of claim 7, further comprising searching for additional channels centered at a multiple of the bandwidth occupied by the channel from the frequency having the highest measured energy.

9. A computer readable medium having stored thereon instructions which, when executed by a processor, cause the processor to:
   receive a plurality of samples of a communication signal, but fewer than all frequencies in a frequency spectrum corresponding to a channel of the communication signal;
   combine the plurality of samples in a window;
   determine positive and negative energy present in the window;
   calculate an absolute value of the positive and negative energy present in the window; and
   compare the absolute value of the positive and negative energy present in the window to a valid channel threshold.

10. The computer readable medium of claim 9, wherein the plurality of samples are a portion of a valid channel when the total energy is greater than the valid channel threshold.

11. A method, comprising:
   receiving a plurality of samples of a communication signal, but fewer than all frequencies in a frequency spectrum corresponding to a channel of the communication signal;
   combining the plurality of samples in a window;
   determining positive and negative energy present in the window;

calculating an absolute value of the positive and negative energy present in the window; and comparing the absolute value of the positive and negative energy present in the window to a valid channel threshold.

12. The method of claim 11, wherein the plurality of samples are a portion of a valid channel when the total energy is greater than the valid channel threshold.

13. A computer readable medium having stored thereon instructions which, when executed by a processor, cause the processor to:

measure energy incident at a first frequency in a frequency spectrum associated with a channel;

measure energy incident at a second frequency in the frequency spectrum, wherein energy associated with at least some frequencies in the spectrum are not measured;

determine whether the energy measured for at least one of the first or second frequencies exceeds a valid channel threshold;

determine a bandwidth utilized by the channel based on the first and second frequencies; and identify a channel type based on the determined bandwidth.

14. The computer readable medium of claim 13, wherein the first frequency is associated with a center of the frequency spectrum, the second frequency is associated with an edge of the frequency spectrum, and the determined bandwidth is associated with double the range between the center and edge frequencies.

15. The computer readable medium of claim 13, wherein the first frequency is associated with a first edge of the frequency spectrum, the second frequency is associated with a second edge of the frequency spectrum, and the determined bandwidth is associated with the range between the first and second edge frequencies.

* * * * *